United States Patent
Li et al.

(10) Patent No.: US 8,394,643 B2
(45) Date of Patent: Mar. 12, 2013

(54) FLUORANTHENE COPOLYMERS AND METHODS OF MAKING AND USING THE SAME

(75) Inventors: Xingui Li, Shanghai (CN); Dunyin Gu, Shanghai (CN); Meirong Huang, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 13/382,888

(22) PCT Filed: Mar. 3, 2011

(86) PCT No.: PCT/CN2011/071499
§ 371 (c)(1),
(2), (4) Date: Jul. 17, 2012

(87) PCT Pub. No.: WO2012/116498
PCT Pub. Date: Sep. 7, 2012

(65) Prior Publication Data
US 2012/0282704 A1    Nov. 8, 2012

(51) Int. Cl.
*G01N 33/00* (2006.01)
*G01N 21/63* (2006.01)
*G01N 21/75* (2006.01)
*G01N 21/77* (2006.01)
*C07C 13/00* (2006.01)

(52) U.S. Cl. ............. 436/110; 436/91; 436/96; 436/106; 436/139; 436/140; 436/164; 436/166; 436/174; 422/82.05; 422/82.09; 585/26; 585/27; 585/400; 313/498; 313/504

(58) Field of Classification Search .................... 436/91, 436/96, 106, 110, 124, 126, 139, 140, 149, 436/164, 165, 166, 174; 422/82.05, 82.09; 585/24, 25, 26, 27, 400; 528/392; 313/498, 313/504
See application file for complete search history.

(56) References Cited

U.S. PATENT DOCUMENTS
6,004,685 A    12/1999   Antoniadis et al.
(Continued)

FOREIGN PATENT DOCUMENTS
CN    10 1328255 A    12/2008
(Continued)

OTHER PUBLICATIONS

Fan, et al., "Electrochemical polymerization of anthracene in boron trifluoride diethyl etherate," *Journal of Electroanalytical Chemistry*, 575, 287-292, 2005.

(Continued)

*Primary Examiner* — Maureen Wallenhorst
(74) *Attorney, Agent, or Firm* — Knobbe, Martens, Olson & Bear, LLP

(57) ABSTRACT

The present application relates to copolymers having at least one optionally substituted fluoranthene as a first monomer unit and at least one optionally substituted pyrrole as a second monomer unit. The copolymer may, for example, emit green light when exposed to a blue or ultraviolet radiation. Methods of making the copolymer are also disclosed, as well as methods and apparatuses for producing light and detecting nitroaromatics using the copolymer.

32 Claims, 10 Drawing Sheets

U.S. PATENT DOCUMENTS

| | | | |
|---|---|---|---|
| 6,127,516 | A | 10/2000 | Bard et al. |
| 6,322,910 | B1 | 11/2001 | Arai et al. |
| 7,183,010 | B2 * | 2/2007 | Jarikov .......................... 428/690 |
| 7,488,856 | B2 | 2/2009 | Schwalm et al. |
| 2008/0213623 | A1 | 9/2008 | Dotz |

FOREIGN PATENT DOCUMENTS

| | | |
|---|---|---|
| CN | 101328255 A | 12/2008 |
| GB | 2463040 A | 3/2010 |
| WO | WO 2010/023443 A2 | 3/2010 |

OTHER PUBLICATIONS

He, et al., "A novel picric acid film sensor via combination of the surface enrichment effect of chitosan films and the aggregation-induced emission effect of siloles," *J. Mater.Chem.*, 19, 7347-7353, 2009.

Hu, et al., "A selective optical sensor for picric acid assay based on photopolymerization of 3-(N-methacryloyl) amino-9-ethylcarbazole," *Analytica Chimica Acta*, 570, 170-175, 2006.

Kawano, et al., "Blue-Emitting Poly(2,7-pyrenylene)s: Synthesis and Optical Properties," *Macromolecules*, 41(21), 7933-7937, 2008.

Li, et al., "Simple Efficient Synthesis of Strongly Luminescent Polypyrene with Intrinsic Conductivity and High Carbon Yield by Chemical Oxidative Polymerization of Pyrene, " *Chem. Eur. J.*, 16, 4803-4813, 2010.

Lu, et al., "A reusable optical sensing layer for picric acid based on the luminescence quenching of the Eu-Thenoyltrifluoroacetone complex," *Analytica Chimica Acta*, 318, 175-179, 1996.

Lu, et al., "Electrochemical polymerization of pyrene in the electrolyte of boron trifluoride diethyl etherate containing trifluoroacetic acid and polyethylene glycol oligomer," *Journal of Electroanalytical Chemistry* 586, 154-160, 2006.

Marciniak, B., "The growth, morphology and perfection of fluoranthene crystals grown from supercooled chlorine derivative solutions on spontaneously formed seeds," *Journal of Crystal Growth*, 236, 333-346, 2002.

Mori, et al., "Synthesis and optical properties of polynaphthalene derivatives," *Optical Materials*, 30, 545-552, 2007.

Nöll, et al., "Electronic Structure and Properties of Poly- and Oligoazulenes," *J. Phys. Chem. C* 112, 2156-2164, 2008.

Ni, et al., "An anthracene/porphyrin dimer fluorescence energy transfer sensing system for picric acid," *Talanta* 63, 251-257, 2004.

Niu, et al., "Covalently immobilized aminonaphthalimide as fluorescent carrier for the preparation of optical sensors," *Anal. Bioanal. Chem.* 372: 519-524, 2002.

Qin, et al., "Polytriazoles with Aggregation-Induced Emission Characteristics: Synthesis by Click Polymerization and Application as Explosive Chemosensors," *Macromolecules*, 42, 1421-1424, 2009.

Saxena, et al., "Fluoroalkylated Polysilane Film as a Chemosensor for Exposive Nitroaromatic Compounds," *Chem. Mater.* 17, 2181-2185, 2005.

Schlüter, et al., "Synthesis of a fully unsaturated all-carbon ladder polymer," *Nature*, vol. 368, 831-834, 1994.

Sohn, et al., "Detection of Nitroaromatic Explosives Based on Photoluminescent Polymers Containing Metalloles," *J. Am. Chem. Soc.*, 125, 3821-3830, 2003.

Sohn, et al., "Detection of TNT and Picric Acid on Surfaces and in Seawater by Using Photoluminescent Polysiloles," *Angew. Chem.* 113, 2162-2163, 2001.

Waltman, et al., "The Electrochemical Oxidation and Polymerization of Polycyclic Hydrocarbons," *J. Electrochem. Soc.*, vol. 132, No. 3, 631-634, 1985.

Xu, et al., "Electrochemical Polymerization of Fluoranthene and Characterization of Its Polymers," *J. Phys. Chem. B*, 110, 2643-2648, 2006.

Yamamoto, et al., "Synthesis of π-conjugated polymers bearing electronic and optical functionalities by organometallic polycondensations and their chemical properties," *Polymer* 48, 5449-5472, 2007.

Yang, et al., "A selective PVC membrane for di- or trinitrophenol based on N,N-dibenzyl-3,3',5,5'-tetramethylbenzidine," *Analyst*, 127, 119-124, 2002.

Yang, et al., "Picric acid sensitive optode based on a fluorescence carrier covalently bound to membrane," *Analyst*, 126, 349-352, 2001.

Zhou, et al., "Electrochemical polymerization of phenanthrene in mixed electrolytes of boron trifluoride diethyl etherate and concentrated sulfuric acid," *Polym. Int.* 57:92-98, 2008.

International Search Report and Written Opinion mailed Nov. 24, 2011 in PCT/CN2011/071499.

Germain, et al., "Optical explosives detection: from color changes to fluorescence turn-on," *Chem. Soc. Rev.*, 2009, 38, 2543-2555.

Ghosh, et al., "Self-Assembly of a Nanoscopic Prism via a New Organometallic Pt3 Acceptor and Its Fluorescent Detection of Nitroaromatics," *Organometallics* 2008, 27, 316-319.

Kertesz, et al., "Electronic Structure of Polyfluoranthene Ladder Polymers," *Macromolecules* 1996, 29, 940-945.

Li, et al., "Functionalized Siloles: Versatile Synthesis, Aggregation-Induced Emission, and Sensory and Device Applications," *Adv. Funct. Mater.* 2009, 19, 905-917.

Sanchez, et al., "Synthesis, Luminescence Properties, and Explosives Sensing with 1,1-Tetraphenylsilole- and 1,1-Silafluorene-vinylene Polymers," *Chem. Mater.* 2007, 19, 6459-6470.

Sanchez, et al., "Efficient blue-emitting silafluorene—fluorine-conjugated copolymers: selective turn-off/turn-on detection of explosives," *J. Mater. Chem.*, 2008, 18, 3143-3156.

Shiraishi, et al., "Trace Detection of Explosive Particulates with a Phosphole Oxide," *ACS Applied Materials & Interfaces*, 2009, vol. 1, No. 7, 1379-1382.

Waltman, et al., "Electrically conducting polymers: a review of the electropolymerization reaction, of the effects of chemical structure on polymer film properties, and of applications towards technology," *Can. J. Chem.*, 1986, vol. 64, 76-95.

Zhang, et al., "Phenothiazine-based oligomers as novel fluorescence probes for detecting vapor-phase nitro compounds," *Talanta* 82 (2010) 1943-1949.

Akcelrud, Leni, "Electroluminescent polymers," 2003, *Progress in Polymer Science*, vol. 28, pp. 875-962.

Schlicke, et al., "Repetitive Synthesis of Soluable Oligofluoranthene Derivatives and their Electrochemical Analysis," 1996, Synlett, *Letters*, pp. 425-426.

* cited by examiner

FLUORANTHENE COPOLYMERS AND METHODS OF MAKING AND USING THE SAME

CROSS-REFERENCE TO RELATED APPLICATIONS

This application is the U.S. National Phase under 35 U.S.C. §371 of International Application No. PCT/CN2011/071499, filed Mar. 3, 2011. The International Application was filed in English. The contents of the International Application are hereby incorporated by reference in their entirety.

BACKGROUND

1. Field

The present application relates to aromatic copolymers, and in particular, fluorescent copolymers.

2. Description

In recent years, attention has been paid to polymerizing aromatic hydrocarbons with dense rings electrochemically and chemically. However, electrochemical polymerization can be difficult to scale-up for manufacturing because the process is limited by the surface area of the working electrodes. Also, some available chemical methods, such as Suzuki coupling and Yamamoto coupling reactions, can require complicated reaction processes. The chemical methods also tend to produce polymers having poor solubility, which can hinder further processing for these polymers. Furthermore, almost all of the existing aromatic hydrocarbons, such as anthracene, phenanthrene, pyrene, fluoranthene, as well as their corresponding polymers, are limited to emitting blue light.

SUMMARY

Some embodiments disclosed herein include a copolymer comprising an optionally substituted fluoranthene as a first monomer unit and an optionally substituted pyrrole as a second monomer unit.

In some embodiments, the first monomer unit is represented by Formula I:

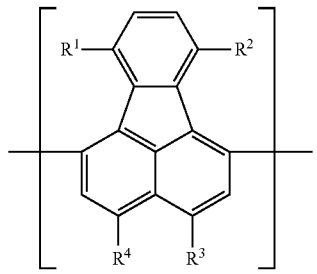

wherein $R^1$, $R^2$, $R^3$, and $R^4$ are each independently selected from the group consisting of hydrogen, $C_{1-6}$ alkyl, $C_{1-6}$ haloalkyl, $C_{1-6}$ alkoxy, $C_{1-6}$ hydroxyalkyl, ester, carboxy, and $C_{1-6}$ alkyl-N($R^5$)($R^6$), and wherein $R^5$ and $R^6$ are each independently selected from hydrogen and $C_{1-6}$ alkyl. In some embodiments, $R^1$, $R^2$, $R^3$, and $R^4$ are each independently selected from the group consisting of hydrogen and $C_{1-6}$ alkyl. In some embodiments, $R^1$, $R^2$, $R^3$, and $R^4$ are each hydrogen. In some embodiments, $R^1$ and $R^2$ are the same. In some embodiments, $R^3$ and $R^4$ are the same. In some embodiments, $R^1$, $R^2$, $R^3$, and $R^4$ are the same.

In some embodiments, the second monomer unit is represented by Formula II:

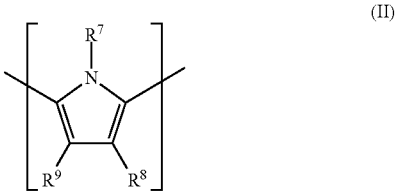

wherein $R^7$, $R^8$, and $R^9$ are each independently selected from the group consisting of hydrogen and $C_{1-6}$ alkyl. In some embodiments, $R^7$, $R^8$, and $R^9$ are each hydrogen. In some embodiments, $R^8$ and $R^9$ are the same. In some embodiments, $R^7$, $R^8$, and $R^9$ are the same.

In some embodiments, the copolymer comprises at least about 30% of the first monomer unit by mole. In some embodiments, the copolymer comprises no more than about 99% of the first monomer unit by mole. In some embodiments, the copolymer comprises at least about 1% of the second monomer unit by mole. In some embodiments, the copolymer comprises no more than about 70% of the second monomer unit by mole. In some embodiments, the molar ratio of the first monomer unit to the second monomer unit is about 30:70 to about 99:1.

In some embodiments, the copolymer exhibits an electrical conductivity of at least $10^{-6}$ S·cm$^{-1}$ when doped with an effective amount of a dopant. In some embodiments, the dopant is iodine.

In some embodiments, the copolymer exhibits a green emission when exposed to ultraviolet or violet radiation. In some embodiments, the green emission has a wavelength of peak emission of about 490 nm to about 570 nm. In some embodiments, the ultraviolet or violet radiation has a peak wavelength of about 350 nm to about 450 nm.

In some embodiments, the copolymer has a weight average molecular weight of at least about 500 Da.

Some embodiments disclosed herein include a method of making a copolymer, the method comprising: forming a composition comprising an oxidizing agent, an optionally substituted pyrrole monomer, and an optionally substituted fluoranthene monomer; and maintaining the composition under conditions effective to polymerize the pyrrole monomer and fluoranthene monomer to form the copolymer.

In some embodiments, the molar ratio of the pyrrole monomer to the fluoranthene monomer is about 70:30 to about 1:99. In some embodiments, the molar ratio of the oxidizing agent to a total amount of monomer components in the composition is no more than about 5:1.

In some embodiments, the composition is maintained at a temperature of about 30° C. to about 70° C.

In some embodiments, forming the composition comprises combining (a) a first solution comprising a first solvent and the oxidizing agent and (b) a second solution comprising a second solvent, the pyrrole monomer, and the fluoranthene monomer, wherein: the first solvent is at least partially immiscible in the second solvent; the oxidizing agent is soluble in the first solvent; and both the pyrrole monomer and the fluoranthene monomer are soluble in both the first and second solvents.

Some embodiments disclosed herein include an apparatus comprising: a light source configured to emit an ultraviolet or violet radiation; and a composition configured to receive at least a portion of the radiation emitted from the light source, wherein the composition comprises a copolymer comprising an optionally substituted fluoranthene as a first monomer unit and an optionally substituted pyrrole as a second monomer unit.

In some embodiments, the apparatus includes a light detector configured to measure light emitted from the composition. In some embodiments, the apparatus includes a housing, wherein the housing contains the composition and is configured to receive a sample adjacent to the composition.

Some embodiments disclosed herein include an organic light-emitting diode comprising: a light-emitting active layer; a conducting layer on one side of the light-emitting active layer; a cathode; and an anode, wherein the light-emitting active layer and conducting layer are disposed between the cathode and the anode, and the light-emitting active layer comprises a copolymer comprising an optionally substituted fluoranthene as a first monomer unit and an optionally substituted pyrrole as a second monomer unit.

Some embodiments disclosed herein include a method of producing light comprising exposing a composition to a violet or ultraviolet radiation, wherein the composition comprises a copolymer comprising an optionally substituted fluoranthene as a first monomer unit and an optionally substituted pyrrole as a second monomer unit.

Some embodiments disclosed herein include a method for detecting nitroaromatics within a sample, the method comprising: providing a sample suspected of containing one or more nitroaromatics; contacting a composition to the sample, wherein the composition comprises a copolymer comprising an optionally substituted fluoranthene as a first monomer unit and an optionally substituted pyrrole as a second monomer unit; exposing the composition to a radiation effective to produce fluorescence from the copolymer; and measuring the amount of fluorescence produced by the copolymer.

In some embodiments, the produced fluorescence is greater in the absence of nitroaromatics than in the presence of nitroaromatics.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
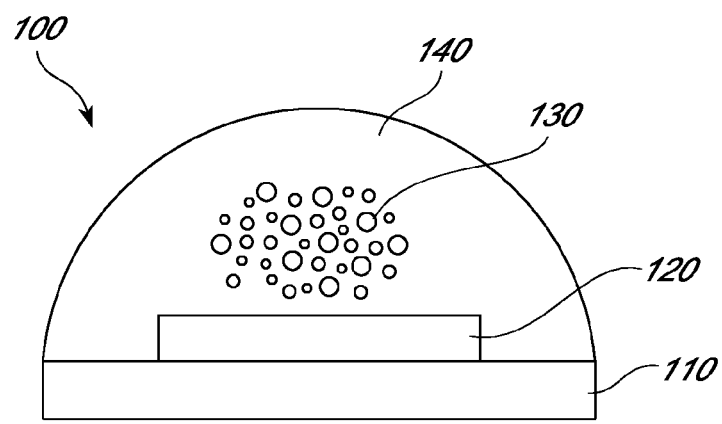
FIG. 1 depicts an illustrative embodiment of a lighting apparatus that is within the scope of the present application (not to scale).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are copolymers having at least one optionally substituted fluoranthene as a first monomer unit and at least one optionally substituted pyrrole as a second monomer unit. The copolymers can, in some embodiments, fluoresce light in the green emission region and exhibit superior solubility properties. The copolymers may be used, for example, in lighting devices and apparatuses for detecting nitroaromatic substances. Also disclosed herein are methods of making the copolymer. The methods can, in some embodiments, include standard polymerization procedures that may be easily scaled for manufacturing purposes. The present application also includes methods of using the copolymer and devices that include the copolymer.

Definitions

As used herein, "halogen" means any one of the radiostable atoms of column 7 of the Periodic Table of the Elements, such as, fluorine, chlorine, bromine and iodine.

As used herein, "alkyl" refers to a straight or branched hydrocarbon chain that comprises a fully saturated (no double or triple bonds) hydrocarbon group. The alkyl group of the compounds may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like. The alkyl group may be substituted or unsubstituted.

As used herein, "alkoxy" refers to the formula —OR where R is an alkyl as defined above. A non-limiting list of alkoxys is methoxy, ethoxy, n-propoxy, 1-methylethoxy(isopropoxy), n-butoxy, iso-butoxy, sec-butoxy, tert-butoxy, and the like. An alkoxy may be substituted or unsubstituted.

As used herein, "haloalkyl" refers to an alkyl having one, two, three, or more of the hydrogen atoms substituted with a halogen. Such groups include but are not limited to, chloromethyl, fluoromethyl, difluoromethyl, trifluoromethyl, 1-chloro-2-fluoromethyl and 2-fluoroisobutyl. A haloalkyl may be substituted or unsubstituted.

As used herein, "hydroxyalkyl" refers to an alkyl group in which one or more of the hydrogen atoms are replaced by a hydroxy group. Examples of hydroxyalkyl groups include but are not limited to, 2-hydroxyethyl, 3-hydroxypropyl, 2-hydroxypropyl, and 2,2-dihydroxyethyl. A hydroxyalkyl may be substituted or unsubstituted.

As used herein, "ester" refers to a "—C(=O)OR" group in which R can be $C_{1-6}$ alkyl. An ester may be substituted or unsubstituted.

As used herein, "carboxy" refers to "C(=O)OH" group.

As used herein, "substituted" refers to independent replacement of one, two, three, or more of the hydrogen atoms in the specified structure with one of the following substituents: halogen, $C_{1-6}$ alkyl, $C_{1-6}$ haloalkyl, $C_{1-6}$ hydroxyalkyl, $C_{1-6}$ alkoxy, ester, carboxy, and $C_{1-6}$ alkyl-N($R^A$)($R^B$), where $R^A$ and $R^B$ are each independently selected from hydrogen and $C_{1-6}$ alkyl.

Fluoranthene/Pyrrole Copolymers

Some embodiments disclosed herein include copolymers having an optionally substituted fluoranthene as a first monomer unit and an optionally substituted pyrrole as a second monomer unit. The fluoranthene may, for example, be a substituted fluoranthene or an unsubstituted fluoranthene. The pyrrole may, for example, be a substituted pyrrole or an unsubstituted pyrrole.

For purposes of the present application, the nomenclature for fluoranthene and pyrrole substitutions is shown below:

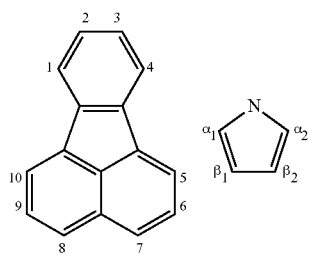

The fluoranthene monomer unit can be symmetric or asymmetric. In some embodiments, the fluoranthene monomer unit is unsubstituted at the 2-, 3-, 6-, and 9-positions, and optionally substituted at the 1-, 4-, 7-, and 8-positions. Non-limiting examples of substituted fluoranthenes include 1-methylfluoranthene, 1-ethyl-4-methyltluoranthene, 7,8-difluorofluoranthene, and 1,4-dihydroxyfluoranthene. The fluoranthene monomer unit may include, for example, zero, one, two, three, or four substitutions. Meanwhile, the 5-position and 10-position may form the main chain of the polymer. That is, the 5-position and 10-position can be covalently linked to a second monomer unit (e.g., pyrrole or a second fluoranthene monomer unit) and a third monomer unit, respectively.

The fluoranthene monomer unit substitutions (if any) can optionally be symmetric. In some embodiments, the 1-position and 4-position are substituted with the same class of substituent. For example, the 1-position and 4-position may each be substituted with an alkyl, such as 1-ethyl-4-propylfluoranthene, or a halogen, such as 1-fluoro-4-chlorofluoranthene. The 1-position and 4-position can also be substituted, for example, with the same group (e.g., 1,4-dimethylfluoranthene). In some embodiments, the 7-position and 8-position are substituted with the same class of substituent or the same group.

The fluoranthene monomer unit may, in some embodiments, be represented by Formula I:

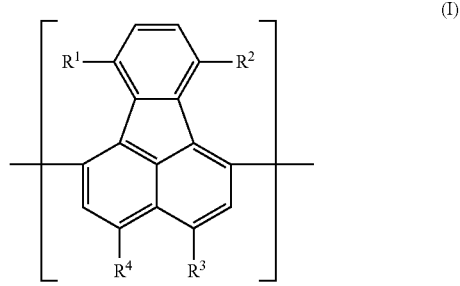

where $R^1$, $R^2$, $R^3$, and $R^4$ are each independently selected from the group consisting of hydrogen, $C_{1-6}$ alkyl, $C_{1-6}$ haloalkyl, $C_{1-6}$ alkoxy, $C_{1-6}$ hydroxyalkyl, ester, carboxy, and $C_{1-6}$ alkyl-N($R^5$)($R^6$), and where $R^5$ and $R^6$ are each independently selected from hydrogen and $C_{1-6}$ alkyl. In some embodiments, $R^1$ and $R^2$ are each the same class of substituent. In some embodiments, $R^1$ and $R^2$ are each the same. In some embodiments, $R^3$ and $R^4$ are each the same class of substituent. In some embodiments, $R^3$ and $R^4$ are each the same. In some embodiments, $R^1$, $R^2$, $R^3$, and $R^4$ are each hydrogen. In some embodiments, $R^1$, $R^2$, $R^3$, and $R^4$ are the same.

In some embodiments, the pyrrole monomer unit is optional substituted at the $\beta_1$- and $\beta_2$-position. In some embodiments, the pyrrole monomer unit is optionally substituted at the nitrogen. The pyrrole monomer unit can include, for example, zero, one, two, or three substitutions. Meanwhile, the $\alpha_1$- and $\alpha_2$-position may form the main chain of the polymer. That is, the $\alpha_1$-position and $\alpha_2$-position can be covalently linked to a second monomer unit and third monomer unit, respectively. The $\beta_1$- and $\beta_2$-position can be substituted, in some embodiments, with the same class of substituent or the same group.

The pyrrole monomer unit may, in some embodiments, be represented by Formula II:

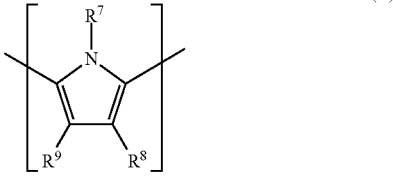

where $R^7$, $R^8$, and $R^9$ are each independently selected from the group consisting of hydrogen and $C_{1-6}$ alkyl. In some embodiments, $R^8$ and $R^9$ are each $C_{1-6}$ alkyl. In some embodiments, $R^8$ and $R^9$ are each the same group. In some embodiments, $R^8$ and $R^9$ are each hydrogen. In some embodiment, $R^7$ is hydrogen. In some embodiments, $R^7$. $R^8$ and $R^9$ are each the same group.

The skilled artisan, guided by the teachings of the present application, can modify the relative amount of the fluoranthene monomer unit and the pyrrole monomer unit in the copolymer to adjust the properties of the polymer. For example, the relative molar ratio of the fluoranthene monomer unit to the pyrrole monomer unit can be adjusted to obtain a copolymer that fluoresces in the green region (e.g., emits light having a wavelength of peak emission in the green region). As another example, the relative molar ratio of the fluoranthene monomer unit to the pyrrole monomer can be adjusted to obtain a copolymer that is soluble in an organic solvent (e.g., at least 1 mg/L dissolves in an organic solvent). The relative molar ratio of the fluoranthene monomer unit to the pyrrole monomer unit in the copolymer can be, for example, at least about 30:70; at least about 40:60; at least about 50:50; at least about 60:40; at least about 70:30; at least about 80:20; or at least about 90:10. The relative molar ratio of the fluoranthene monomer unit to the pyrrole monomer unit in the copolymer can be, for example, less than or equal to about 99:1; less than or equal to about 95:5; less than or equal to about 90:10; or less than or equal to about 85:15.

The total molar amount of each monomer unit in the copolymer is also not particularly limited. The total amount of fluoranthene monomer unit in the copolymer can be, for example, at least about 30% by mole; at least about 40% by mole; at least about 50% by mole; at least about 60% by mole; at least about 70% by mole; at least about 80% by mole; or at least about 90% by mole. The total amount of fluoranthene monomer unit in the copolymer can be, for example, less than or equal to about 99% by mole; less than or equal to about 95% by mole; less than or equal to about 90% by mole; or less than or equal to about 85% by mole.

The total amount of pyrrole monomer unit in the copolymer can include, for example, at least about 1% by mole; at least about 5% by mole; at least about 10% by mole; or at least about 15% by mole. The total amount of pyrrole monomer unit in the copolymer can include, for example, less than or equal to about 70% by mole; less than or equal to about 60% by mole; less than or equal to about 50% by mole; less than or equal to about 40% by mole; less than or equal to about 30% by mole; less than or equal to about 20% by mole; or less than or equal to about 10% by mole.

It will be appreciated that the "total amount" of the pyrrole monomer unit or fluoranthene monomer unit can include the combined amount of any substituted or unsubstituted monomer units. For example, the copolymer may include 30% by mole fluoranthene as a monomer unit and 30% by mole 1-methylfluoranthene as a monomer unit. The total amount of fluoranthene in this case would be 60% by mole in the copolymer. As another example, the copolymer may include 10% by mole 1,4-difluorofluoranthene as a monomer unit and 70% by mole 1-methylfluoranthene as a monomer unit. This copolymer would include 80% by mole fluoranthene. The total amount of monomer may also be expressly limited to one or more specific monomers (or a sub-genus of monomers) disclosed in the present application.

The copolymer may optionally include other monomer units. For example, the copolymer could include various aryls or heterocycles, such as fluorene or thiophene. The copolymer may include, for example, less than or equal to about 10% by mole of other monomer units; less than or equal to about 5% by mole of other monomer units; less than or equal to about 1% by mole of other monomer units; less than or equal to about 0.5% by mole of other monomer units; or less than or equal to about 0.1% by mole of other monomer units. The copolymer may include, for example, at least about 0.1% by mole of other monomer units; at least about 0.5% by mole of other monomer units; at least about 1% by mole of other monomer units; at least about 5% by mole of other monomer units. In some embodiments, the copolymer consists essentially of a fluoranthene monomer unit and a pyrrole monomer unit. That is, the copolymer includes a fluoranthene monomer unit, a pyrrole monomer unit, and amounts of other monomer units that do not substantially alter the green emission of the copolymer. In some embodiments, the copolymer consists of fluoranthene monomer units and pyrrole monomer units.

The copolymer can be a random copolymer or a block copolymer. The copolymer may also form an amorphous solid or a semi-crystalline solid. In some embodiments, the copolymer has a molecular weight that is sufficiently low for the copolymer to be soluble in an organic solvent, such as tetrahydrofuran (THF), n-methyl pyrrolidone (NMP), and dimethyl sulfoxide (DMS). In some embodiments, the copolymer has a degree of cross-linking sufficiently low for the copolymer to be soluble in an organic solvent, such as tetrahydrofuran, n-methylpyrrolidone, and dimethyl sulfoxide. The weight average molecular weight of the copolymer can be, for example, about 500 Da; about 1,000 Da; about 1,500 Da; about 2,000 Da; about 2,500 Da; or ranges between any two of these values.

The copolymer may, in some embodiments, exhibit electrical conductivity when doped with an effective amount of dopant. For example, an 80/20 fluoranthene-pyrrole copolymer can exhibit a conductivity of about $2.7 \cdot 10^{-3}$ S·cm$^{-1}$ when doped with iodine vapor. In some embodiments, the copolymer exhibits a conductivity of at least about $10^{-6}$ S·cm$^{-1}$ when doped with an effective amount of dopant. In some embodiments, the copolymer exhibits a conductivity of at least about $10^{-5}$ S·cm$^{-1}$ when doped with an effective amount of dopant. In some embodiments, the copolymer exhibits a conductivity of at least about $10^{-4}$ S·cm$^{-1}$ when doped with an effective amount of dopant. In some embodiments, the copolymer exhibits a conductivity of at least about $10^{-3}$ S·cm$^{-1}$ when doped with an effective amount of dopant. In some embodiments, the copolymer exhibits a conductivity of at least about $10^{-2}$ S·cm$^{-1}$ when doped with an effective amount of dopant. Non-limiting examples of dopants include halogenated compounds, such as iodine, bromine, chlorine, iodine trichloride; protonic acids such as sulfuric acid, hydrochloric acid, nitric acid, perchloric acid; Lewis acids, such as aluminum trichloride, ferric trichloride, molybdenum chloride; and organic acids, such acetic acid, trifluoracetic acid, and benzenesulfonic acid. In some embodiments, the dopant is iodine.

The copolymer can also exhibit fluorescence when exposed to radiation. In some embodiments, the copolymer may exhibit green emission when exposed to blue or ultraviolet radiation. The green emission may, for example, have a wavelength of peak emission of about 490 nm to about 570 nm. The blue or ultraviolet radiation may, for example, have a peak wavelength of about 350 nm to about 450 nm.

Some embodiments disclosed herein include a composition comprising one or more copolymers having at least one optionally substituted fluoranthene as a first monomer unit and at least one optionally substituted pyrrole as a second monomer unit. The copolymer can be any of the copolymers described in the present application. The composition can, for example, include at least about 1% by weight of the copolymer; at least about 5% by weight of the copolymer; at least about 10% by weight of the copolymer; at least about 25% by weight of the copolymer; or at least about 50% by weight of the copolymer. The composition can be a solid, such as a film. The composition can also be a solution, such as the copolymer dissolved or dispersed in a solvent. In some embodiments, the composition can be a blend that includes other polymers. Generally, any inert polymer may be blended with the copolymer; such inert polymers can be, for example, acrylics, polyolefins, polyamides, polyesters, fluoropolymers, vinyl polymers, and the like. For example, the composition can be a blend of 80/20 fluoranthene-pyrrole copolymer and poly(methyl methacrylate).

Method of Making Fluoranthene/Pyrrole Copolymers

Some embodiments disclosed herein include a method of making a copolymer having at least one optionally substituted fluoranthene as a first monomer unit and at least one optionally substituted pyrrole as a second monomer unit. Any of the copolymers described above can be prepared using this process.

The method can include, in some embodiments, oxidative polymerization of an optionally substituted fluoranthene and an optionally substituted pyrrole. In some embodiments, the method includes forming a composition comprising an oxidizing agent, an optionally substituted pyrrole monomer, and an optionally substituted fluoranthene monomer; and maintaining the composition under conditions effective to polymerize the pyrrole monomer and fluoranthene monomer to form the copolymer.

The skilled artisan, guided by the teachings of the present application, will appreciate that any of the monomer units described above with respect to the copolymer structure have corresponding monomers that will form the monomer units upon polymerization. Thus, for example, the monomer units in the copolymer can include a covalent attachment at both the 5-position and 10-position, whereas the corresponding monomer that polymerizes to form the monomer unit can include hydrogen at both the 5-position and 10-position. It is therefore contemplated that certain embodiments of the method include polymerizing one or more specific monomer structures that correspond with one or more of the monomer units described above. Similarly, the molar ratio of the monomer components, as well as the total molar percentage of each monomer component in the polymer, may also be the same as discussed above with respect to the copolymer. For example, the molar ratio of the optionally substituted fluoranthene monomer to the optionally substituted pyrrole monomer that polymerize to form the copolymer may be about 70:30 to about 99:1.

The step of forming the composition is not particularly limited. Any suitable method of combining the ingredients is within the scope of the present application. For example, the oxidizing agent can be combined (e.g., mixed or dissolved) in a first solvent, while both the optionally substituted fluoranthene monomer and optionally substituted pyrrole monomer can be combined (e.g., mixed or dissolved) in a second solvent. The second solvent may then be added drop-wise to the first solvent. The first and second solvents may be the same or different. In some embodiments, the first solvent is at least partially immiscible in the second solvent. In some embodiments, the oxidizing agent is soluble in the first solvent. In some embodiments, both the optionally substituted pyrrole monomer and the optionally substituted fluoranthene monomer are soluble in both the first and second solvents. Non-limiting examples for the first solvent include nitromethane, nitroethane, and propylene carbonate. Non-limiting examples for the second solvent include nitromethane, nitroethane, hexane, and chloroform.

Without being bound to any particular theory, it is believed that the oxidative polymerization occurs via dehydrogen coupling between the fluoranthene and pyrrole monomers. Thus, oxidative agents that can dehydrogenate and dissolve in the solvent system (e.g., nitromethane) without excessive side-reactions could be selected as the oxidizing agent. Examples of oxidizing agents include, but are not limited to, $AlCl_3$, $MoCl_5$ and $CuCl_2$.

The molar ratio of the oxidizing agent to the total amount of monomer components in the composition can be, for example, at least about 1:1; at least about 1.5:1; at least about 2:1; or at least about 2.5:1. The molar ratio of the oxidizing agent to the total amount of monomer components in the composition can be, for example, less than or equal to about 5:1; less than equal to about 4.5:1; less than or equal to about 4:1; less than or equal to about 3.5:1; or less than or equal to about 3:1.

After forming the composition having the monomer components and oxidizing agent, the composition can be maintained at conditions effective to polymerize the pyrrole monomer and fluoranthene monomer to form the copolymer. For example, the composition can be maintained at about atmospheric pressure and a temperature of about 30° C. to about 70° C. In some embodiments, the temperature can be about 40° C. to about 60° C. In some embodiments, the temperature can be about 45° C. to about 55° C. Specific examples of temperatures include about 35° C., about 40° C., about 45° C., about 50° C., about 55° C., about 60° C., about 65° C. about 70° C., and ranges between any two of these values. The composition may be maintained at the conditions for a period of time sufficient to obtain the copolymer. The composition, for example, may be maintained at the conditions for at least about 30 minutes; at least about 1 hour; at least about 2 hours; at least about 3 hours; at least about 4 hours; at least about 5 hours, or ranges between any two of these values.

Methods and Apparatuses for Emitting Light

Some embodiments of the present application include methods and apparatuses for forming light.

A method of producing light can include exposing a composition to a violet or ultraviolet radiation, where the composition includes a copolymer having at least one optionally substituted fluoranthene as a first monomer unit and at least one optionally substituted pyrrole as a second monomer unit. The method of producing light can include any of the copolymers described in this application. The blue or ultraviolet radiation may, for example, have a peak wavelength of about 350 nm to about 450 nm. In some embodiments, the method produces green light. For example, the green emission may have a wavelength of peak emission of about 490 nm to about 570 nm.

FIG. 1 depicts an illustrative embodiment of a lighting apparatus that is within the scope of the present application. Lighting apparatus 100 includes substrate 110 having a light source 120 disposed above substrate 110. The light source can be coupled to an electric source and configured to emit blue or ultraviolet radiation. For example, the light source can be an indium gallium nitride (InGaN) semiconductor. Copolymer 130 is disposed above light source 120 and configured to receive at least a portion of the radiation from light source 120. Copolymer 130 can be a powder dispersed in encapsulant resin 140. For example, encapsulant resin 140 may be an epoxy. As an alternative, the copolymer can be a film disposed above the light source (not shown).

In some embodiments, the apparatus includes: a light source configured to emit an ultraviolet or violet radiation; and a composition configured to receive at least a portion of the radiation emitted from the light source, where the composition includes a copolymer having an optionally substituted fluoranthene as a first monomer unit and an optionally substituted pyrrole as a second monomer unit. The copolymer can be any of the copolymers described in this application.

The copolymers of the present application may also be included in an organic light emitting diode (OLED). OLEDs are well-known in the art. For example, U.S. Pat. No. 6,322,910 discloses various configurations for OLEDs. A typical OLED can include a light emitting layer disposed between a cathode and anode. A current flow between the cathode and anode can result in electrons recombining with electron holes in the light emitting layer. This recombination can result in emission. Thus, for example, an OLED can include one or more of the copolymers of the present application in the light emitting layer. In some embodiments, the OLED can include multiple emissive layers.

Figure 2:
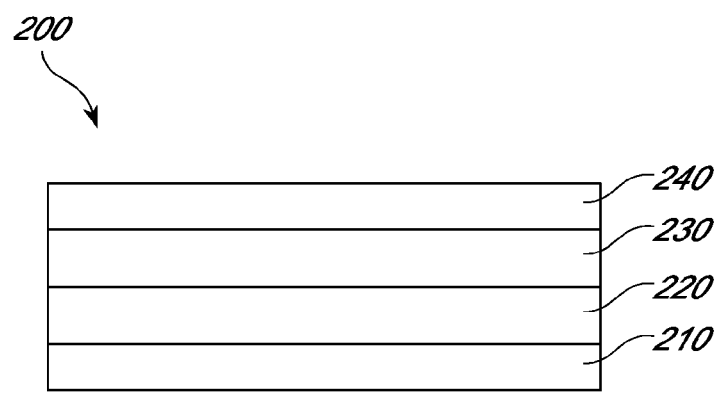
FIG. 2 is an illustrative embodiment of an organic light emitting diode that is within the scope of the present application (not to scale).

FIG. 2 is an illustrative embodiment of an organic light emitting diode that is within the scope of the present application. OLED 200 includes anode 210 having conducting layer 220 above anode 210. Emissive layer 230 is disposed between conductive layer 220 and cathode 240. The anode can be, for example, indium tin oxide (ITO), which can optionally be disposed on a transparent substrate (e.g., glass) (not shown). Meanwhile, metals with low work functions, such as barium or calcium, can be used to form the cathode. The conductive layer can be a conductive polymer, such as poly(3,4-ethylenedioxythiophene) poly(styrenesulfonate) (PEDOT:PSS). The emissive layer can include any of the copolymers in the present application.

Methods and Apparatuses for Detecting Nitroaromatics

Some embodiments of the present application include methods and apparatuses for detecting nitroaromatics. With being bound to any particular theory, it is believed that nitroaromatics can quench fluorescence of the copolymers described in the present application. Thus, if the copolymer exhibits reduced fluorescence, this may be correlated with exposing the polymer to a nitroaromatic.

Non-limiting examples of nitroaromatics that may be detected using the methods and apparatuses disclosed in the present application include picric acid, nitrobenzene, dinitrobenzene, nitrotoluene, TNT (3,4,6-trinitrotoluene), DNT (2,4-dinitrotoluene), nitrophenol, 1,3,5-trinitrobenzene (TNB), and 2,6-dinitrobenzonitrile (DNB).

In some embodiments, a method for detecting nitroaromatics includes: (a) providing a sample suspected of containing one or more nitroaromatics; (b) contacting a composition to the sample, where the composition includes a copolymer having at least one optionally substituted fluoranthene as a first monomer unit and at least one optionally substituted pyrrole as a second monomer unit; (c) exposing the composition to a radiation effective to produce fluorescence from the copolymer; and (d) measuring the amount of fluorescence produced by the copolymer. In some embodiments, the produced fluorescence is greater in the absence of nitroaromatics than in the presence of nitroaromatics. The fluorescence can be measured, for example, by measuring the fluorescence intensity at a pre-determined color or wavelength. For example, the intensity of green emission at a wavelength of about 510 nm can be measure. In some embodiments, the radiation effective to produce fluorescence from the copolymer is a blue or ultraviolet radiation.

Figure 3:
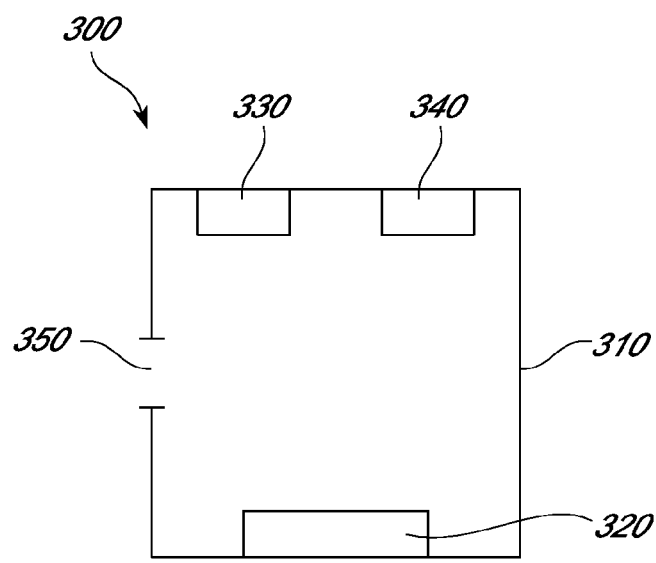
FIG. 3 depicts an illustrative embodiment of an apparatus for detecting nitroaromatics that is within the scope of the present application (not to scale).

FIG. 3 depicts an illustrative embodiment of an apparatus for detecting nitroaromatics that is within the scope of the present application. Apparatus 300 can include housing 310 that contains copolymer film 320, light source 330, light detector 340, and port 350. Copolymer film 320 can include any of the copolymers described in the present application. Light source 330 is configured to emit radiation effective to produce fluorescence from copolymer film 320. For example, light source 330 can be an InGaN semiconductor that emits blue or ultraviolet radiation. Light detector 340 can be configured to measure light emission from the copolymer. Port 350 can be configured to receive a sample into the housing. Thus, for example, a sample suspected of containing nitroaromatic may be placed into housing 310 via port 350, so that the sample contacts copolymer film 320. Light source 330 may then emit light and the fluorescence is detected by light detector 340. The amount of fluorescence may then be correlated with the presence of nitroaromatics in the sample.

In some embodiments, the apparatus for detecting nitroaromatics includes a processor coupled to at least the light source and light detector (not shown). The processor may be configured to synchronize both emitting light from the light source and detecting fluorescence with the light detector. The processor may also receive measurement data from the light detector and automatically correlate this data with the presence of nitroaromatics.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EXAMPLES

Additional embodiments are disclosed in further detail in the following examples, which are not in any way intended to limit the scope of the claims.

Example 1

Polymerization of Copolymers

The chemical oxidative polymerization for the synthesis of the fluoranthene-pyrrole copolymer was carried out with $FeCl_3$ as both catalyst and oxidant in n-$C_6H_{14}$/$CH_3NO_2$ biphase medium at 50° C.

A typical procedure included adding fluoranthene (2.4 mmol) and pyrrole (0.6 mmol) solution in n-$C_6H_{14}$ (15 mL) dropwise to $FeCl_3$ (9 mmol) solution in $CH_3NO$, (10 mL) at 50° C. in a water bath with constant stirring for 6 hours. As soon as the monomer solution was added, the reaction mixture turned a dark color. After reaction, the copolymer precipitate was isolated by centrifugation and washed with an excess of ethanol and distilled water until the top layer liquid in the centrifuge tubes became colorless. After that, the liquid was tested for residual $Fe^{2+}$ and $Fe^{3+}$ by adding potassium ferricyanide and potassium ferrocyanide to a sample of the aqueous solution. The sample did not exhibit a blue color; therefore, the sample included very low amounts of $Fe^{2+}$ and $Fe^{3+}$. Then HCl was used to replace trace amounts of $FeCl_3$ and $FeCl_2$ (reduction product of $FeCl_3$) on the backbone of the copolymer. Subsequently, ammonia was employed to remove the HCl remaining in the copolymer and a tan powder of purified 80/20 fluoranthene-pyrrole copolymer was obtained after drying under an IR lamp. The polymerization procedure was repeated with various molar ratios shown in Table 1.

The solubility of the copolymer powders was also evaluated by thoroughly dispersing a 3 mg sample within 5 mL of solvent. After the mixture was swayed for 24 hours at room temperature, the solubility of the polymers was observed. The results are shown in Table 1 below.

TABLE 1

Summary of Polymerization Results

| Fluoranthene-Pyrrole Ratio | Yield (%) | Color of powder | THF Solubility | NMP Solubility | DMSO Solubility |
|---|---|---|---|---|---|
| 100/0 | 39.6 | red-brown | Soluble | Soluble | Soluble |
| 90/10 | 44.6 | tan | Soluble | Soluble | Soluble |
| 80/20 | 57.0 | tan | Soluble | Soluble | Soluble |
| 70/30 | 45.9 | dark brown | Mainly soluble | Soluble | Soluble |
| 60/40 | 40.7 | dark brown | Slightly soluble | Partially soluble | Mainly soluble |
| 50/50 | 60.9 | blackish brown | Slightly soluble | Partially soluble | Mainly soluble |
| 0/100 | 98.8 | black | Insoluble | Insoluble | Insoluble |

Example 2

Copolymer Conductivity

The copolymers powders prepared according to Example 1 and sufficient 1, particles were kept in a sealed tube at 80° C. under atmospheric pressure for a week. The copolymer powder did not directly contact the $I_2$ particles. After 1, vapor doping, the copolymer powder turned to black. The bulk electrical conductivity of the copolymer powders before and after doping was measured by a two-electrode method using a UT70 A multimeter at ambient temperature.

The electrical conductivity is shown in Table 2. This Example demonstrates that incorporating pyrrole monomer units can increase the conductivity of the resulting copolymer.

TABLE 2

Summary of Electrical Conductivity Results

| Fluoranthene-Pyrrole Ratio | Undoped Conductivity (S/cm) | $I_2$-doped Conductivity (S/cm) | Ratio of Doped-Undoped Conductivity |
|---|---|---|---|
| 100/0 | $2.1 \cdot 10^{-8}$ | $5.6 \cdot 10^{-6}$ | 266 |
| 90/10 | $9.2 \cdot 10^{-7}$ | $8.1 \cdot 10^{-5}$ | 88 |
| 80/20 | $3.3 \cdot 10^{-6}$ | $2.7 \cdot 10^{-3}$ | 818 |
| 70/30 | $4.2 \cdot 10^{-6}$ | $6.4 \cdot 10^{-3}$ | 1524 |
| 60/40 | $7.2 \cdot 10^{-6}$ | $2.1 \cdot 10^{-2}$ | 2917 |
| 50/50 | $2.5 \cdot 10^{-5}$ | $4.6 \cdot 10^{-2}$ | 1.84 |
| 0/100 | $9.9 \cdot 10^{-4}$ | 0.08 | 81 |

Example 3

IR Spectra

Figure 4:
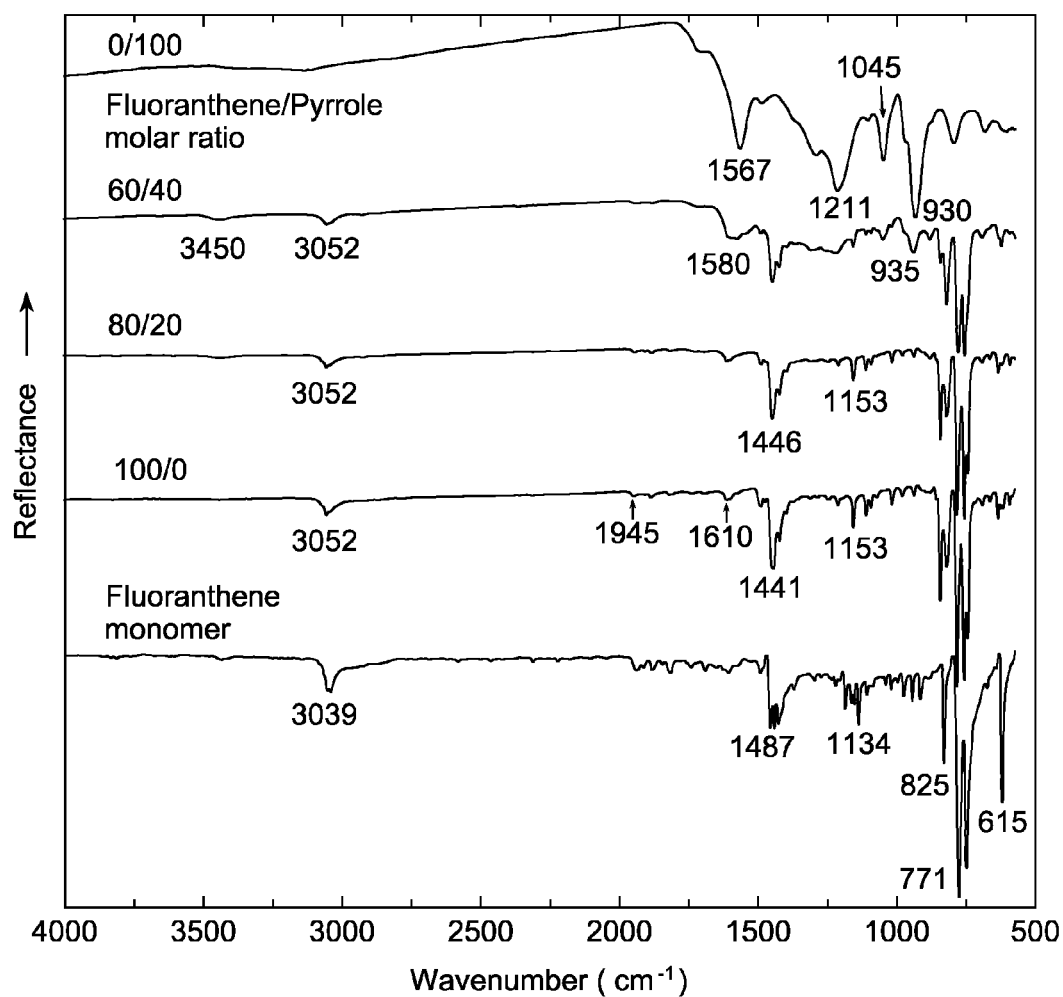
FIG. 4 shows the IR spectra for fluoranthene-pyrrole copolymers with various molar ratios of fluoranthene to pyrrole.

IR spectra were recorded with a Nicolet Magna-IR 550 spectrometer in a reflection mode. Representative IR reflection spectra for fluoranthene-pyrrole copolymers with a molar ratio of 100/0, 80/20, 60/40 and 0/100 are shown in FIG. 4.

This Example demonstrates that the copolymer is structurally distinct from the fluoranthene monomer.

Example 4

UV-visible Spectra

Figure 5:
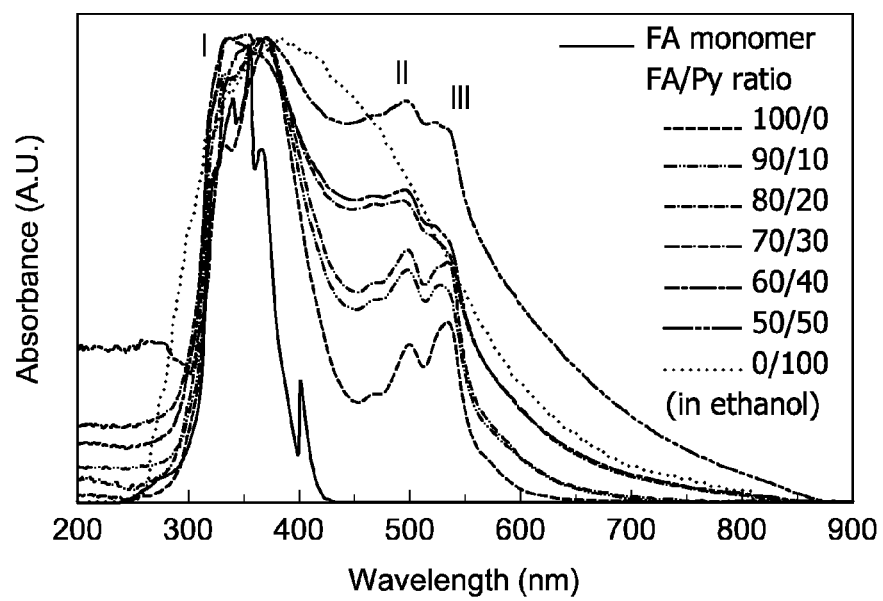
FIG. 5 shows the UV-visible absorbance spectra for fluoranthene-pyrrole copolymers with various molar ratios of fluoranthene to pyrrole.

The UV-Visible absorption spectra were measured on a Lambda 35 UV-V is spectrophotometer between 200 and 900 nm in NMP. The results are shown in FIG. 5 and the key parameters of the spectra are summarized in Table 3.

TABLE 3

Summary UV-visible Spectra

| Fluoranthene-Pyrrole Ratio | Band I (nm) | Band II (nm) | Band III (nm) | Intensity ratio (III/I) |
|---|---|---|---|---|
| Fluoranthene Monomer | 356 | 367 | 401 | 0.36 |
| 100/0 | 371 | 500 | 534 | 1.14 |
| 90/10 | 370 | 498 | 527 | 0.95 |
| 80/20 | 370 | 498 | 535 | 0.93 |
| 70/30 | 355 | 495 | 533 | 0.88 |
| 60/40 | 335 | 495 | 533 | 0.88 |
| 50/50 | 368 | 499 | 535 | 0.94 |
| 0/100 | 384 | — | — | — |

This Example demonstrates that increasing the pyrrole monomer content increase the π-conjugation and decreases the band-gap in the copolymer.

Example 5

Fluorescence Spectra

Figure 6:
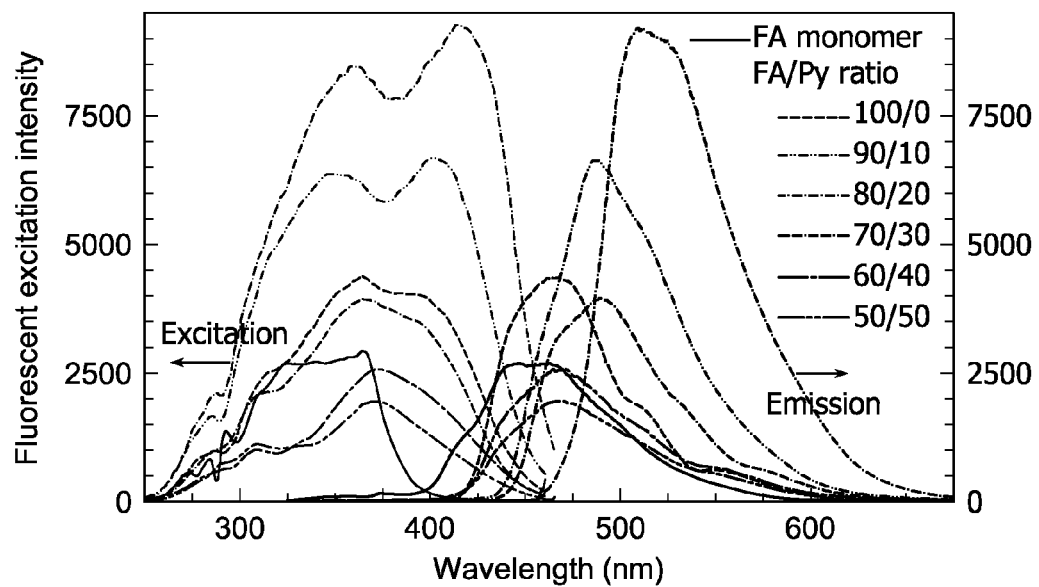
FIG. 6 shows the fluorescence excitation and emission spectra for fluoranthene-pyrrole copolymers with various molar ratios of fluoranthene to pyrrole.

The fluorescence excitation and emission spectra of the copolymer solutions were obtained at slit widths of 2.5 nm using a F-7000 FL Spectrophotometer. FIG. 6 shows the excitation and emission for various fluoranthene-pyrrole copolymers. The spectral characteristics are summarized in Table 4.

TABLE 4

Summary of Fluorescent Spectra

| Fluoranthene-Pyrrole Ratio | Excitation $\lambda_{Ex}$ (nm) | Emission $\lambda_{Em}$ (nm) | Stokes' Shift (nm) |
|---|---|---|---|
| Fluoranthene Monomer | 364 | 445 | 89 |
| 100/0 | 364 | 467 | 96 |
| 90/10 | 401 | 488 | 118 |
| 80/20 | 416 | 512 | 142 |
| 70/30 | 365 | 490 | 135 |
| 60/40 | 372 | 472 | 137 |
| 50/50 | 371 | 467 | 99 |

This Example demonstrates that the relative monomer unit content can be modified to adjust the fluorescence properties of the copolymer.

Example 6

Copolymer X-ray Diffraction

Figure 7:
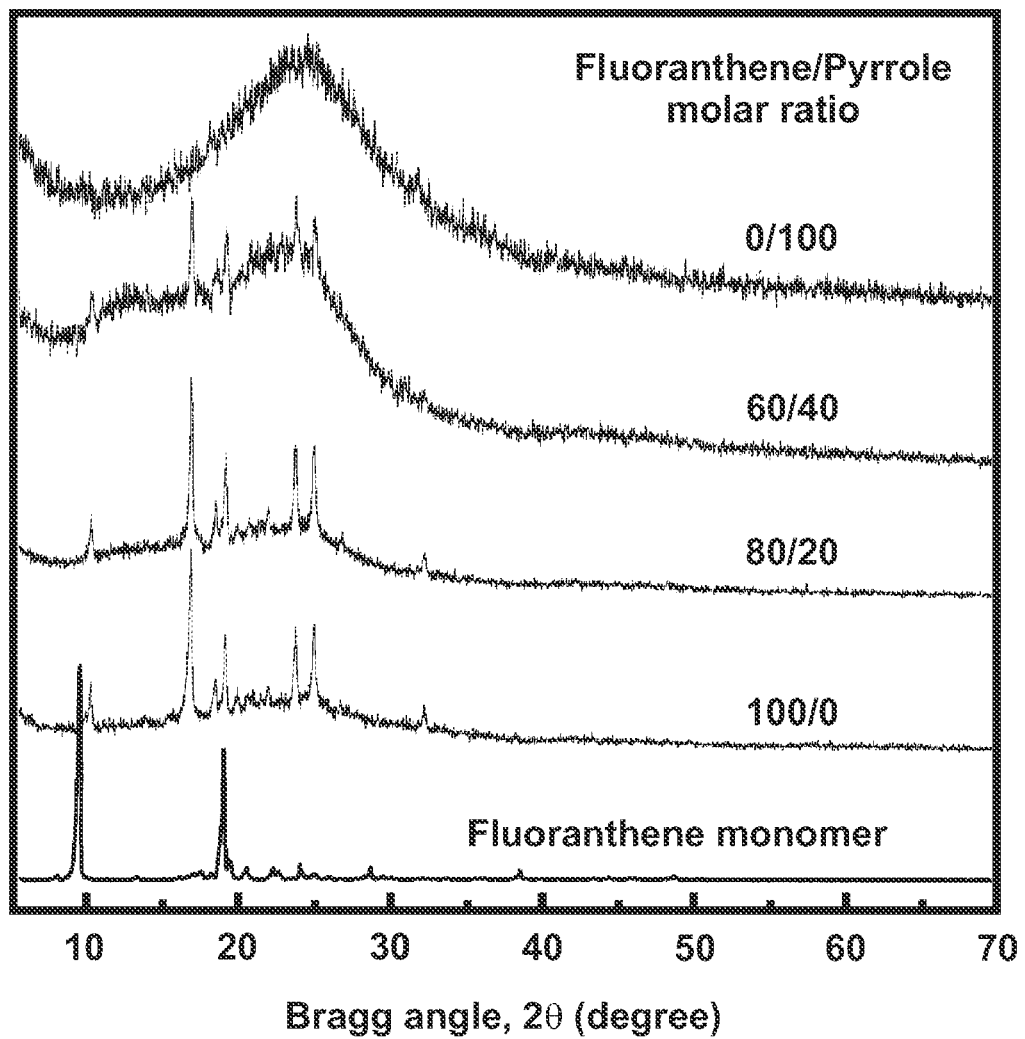
FIG. 7 is wide-angle X-ray diffractograms for various fluoranthene-pyrrole copolymers.

The copolymers powders prepared according to Example 1 were examined using X-ray diffraction. Wide-angle X-ray diffractograms were obtained using a Rigaku D/max2550VB3+/PC model X-ray diffractometer with $CuK_\alpha$ radiation having a wavelength of 0.15406 nm over a 2θ range from 3° to 90°. The results are shown in FIG. 7.

This Example shows that the copolymer can be semi-crystalline and incorporate crystal packing feature found in both the polyfluoranthene and polypyrrole homopolymers.

Example 7

Copolymer Films

A composite film was fabricated by ultrasonically dissolved about 1 part by weight of undoped 80/20 fluoranthene-pyrrole copolymer prepared according to Example 1 and 99 parts by weight of poly(methyl methacrylate) (PMMA) in methylene chloride. The solution was cast onto a quartz plate. After drying for a period of time, the film with a thickness of about 30 μm was formed on the quartz plate for fluorescence characterization. The prepared sensing film was stored in a desiccator until use.

A second homogeneous film was formed using the same solvent casting procedures. Only the homogeneous film did not exhibit measurable fluorescence, while the heterogeneous film produced detectable fluorescence.

Figure 8:
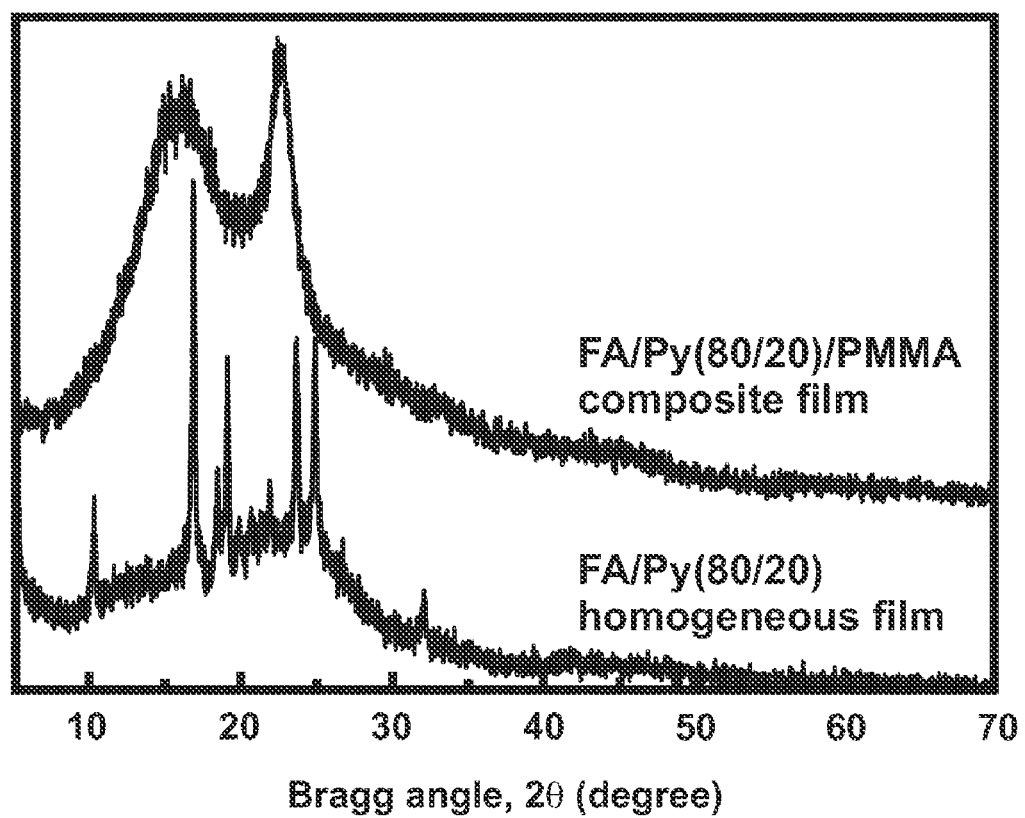
FIG. 8 is wide-angle X-ray diffractograms for homogeneous and composite fluoranthene-pyrrole copolymer films.

The wide-angle X-ray diffractograms for the composite film and homogeneous film are shown in FIG. 8.

The Example demonstrates that a small amount of crystalline copolymer was not detected by X-ray diffraction because the content of the copolymer is too low to aggregate. Therefore, the composite film is a "solid solution" containing the copolymer in PMMA "solvent," which may inhibit self-quenching observed in pure copolymer solid films.

Example 8

Modifying Polymerization Conditions

Figure 9:
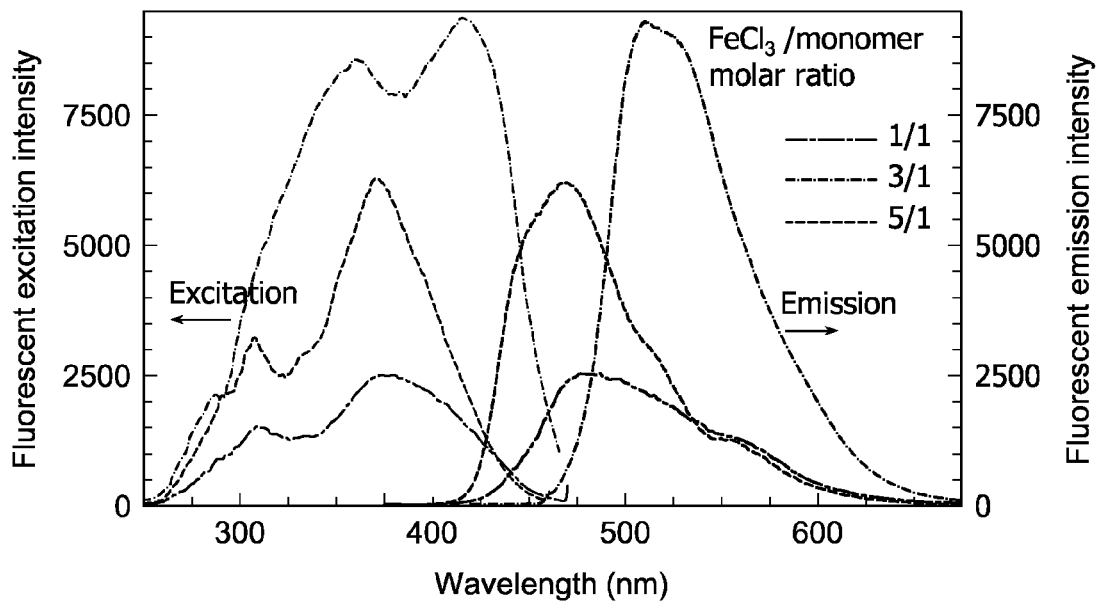
FIG. 9 shows the fluorescence spectra for 80/20 fluoranthene-pyrrole copolymers that were polymerized using different molar ratios of oxidizing agent to total monomer components.
Figure 10:
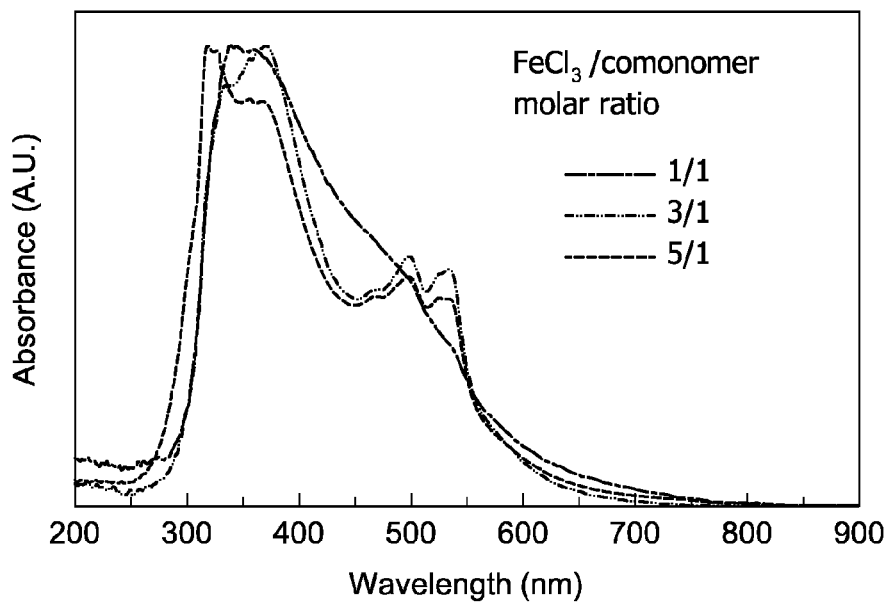
FIG. 10 shows the UV-visible absorbance spectra for 80/20 fluoranthene-pyrrole copolymers that were polymerized using different molar ratios of oxidizing agent to total monomer components.

Additional copolymers were prepared using generally the same procedures described in Example 1. However, in one set of experiments the molar ratio of $FeCl_3$ to total monomer components was 1:1, 3:1, or 5:1 to form an 80/20 fluoranthene-pyrrole copolymer. The fluorescence spectra and UV-visible spectra for these copolymers were determined according to the same procedures in Examples 5. The results are shown in FIG. 9 and FIG. 10.

Figure 11:
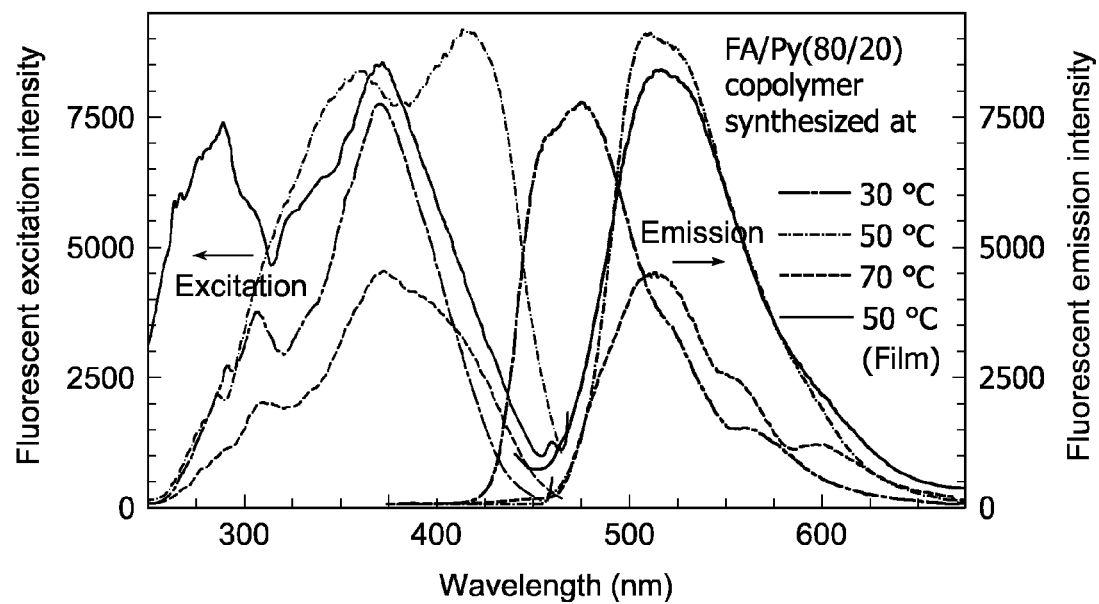
FIG. 11 shows the fluorescence spectra for 80/20 fluoranthene-pyrrole copolymers that were polymerized at various temperatures.
Figure 12:
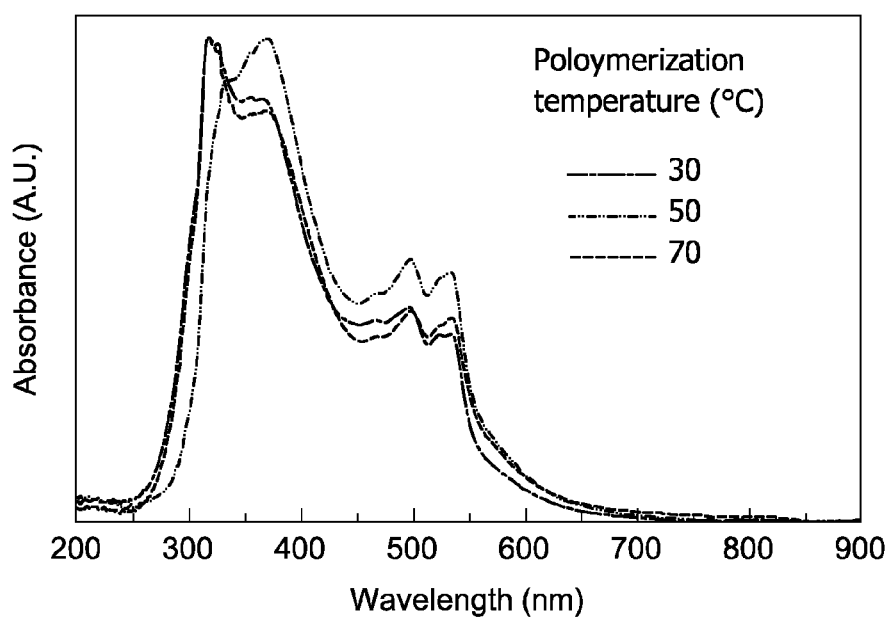
FIG. 12 shows the UV-visible absorbance spectra for 80/20 fluoranthene-pyrrole copolymers that were polymerized at various temperatures.

In another set of experiments, the temperature during polymerization was varied to 30° C., 50° C., or 70° C. to form an 80/20 fluoranthene-pyrrole copolymer. The fluorescence spectra are shown in FIG. 11. For comparison, FIG. 11 also includes the fluorescence spectra for a copolymer film prepared according to generally the same procedures in Example 7. The UV-visible spectra are shown in FIG. 12.

This Example demonstrates that the polymerization conditions can alter the copolymer structure and fluorescence properties.

Example 9

Copolymer Solution for Sensing Nitroaromatic Picric Acid

Figure 13:
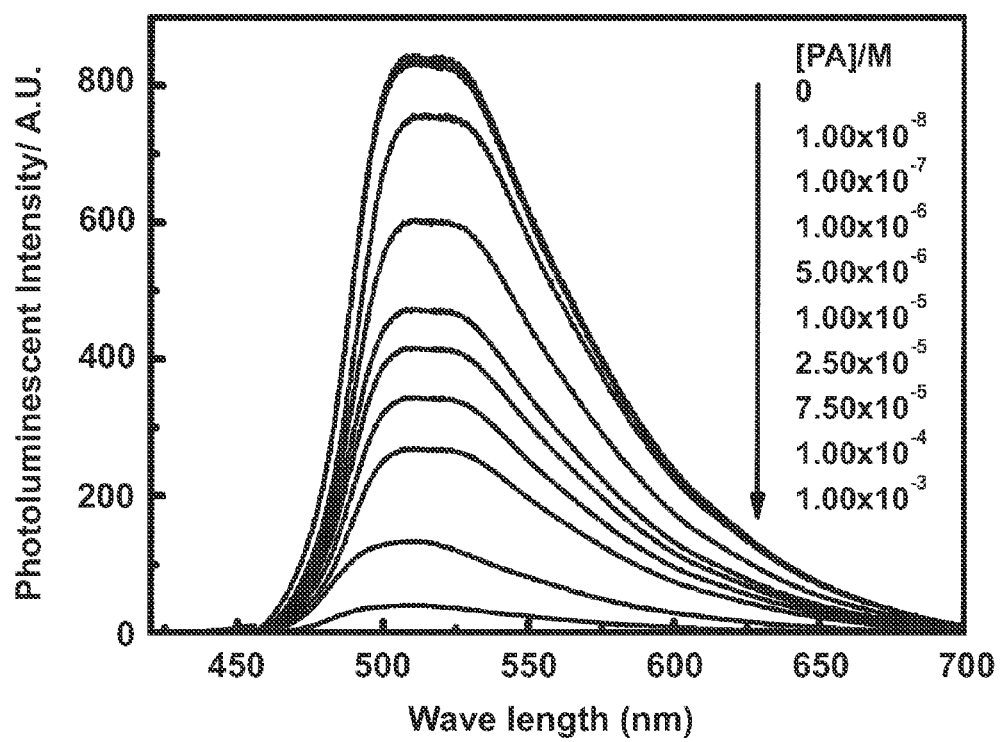
FIG. 13 shows the fluorescence spectra of a 20 mg/L solution of 80/20 fluoranthene-pyrrole copolymer after adding various amounts of picric acid.
Figure 14:
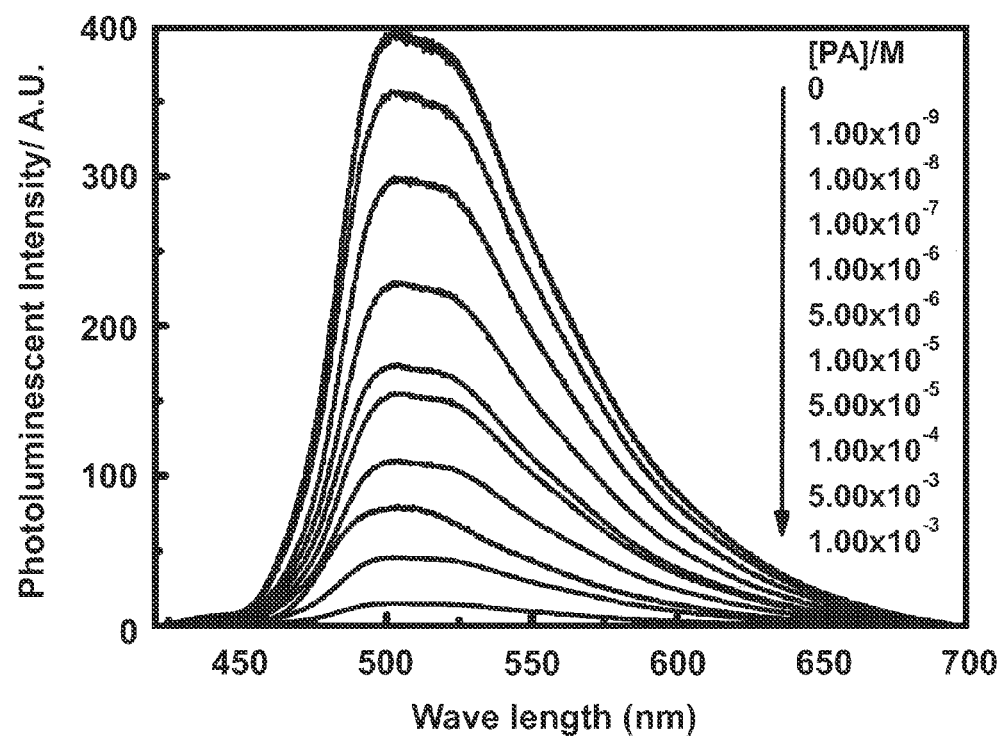
FIG. 14 shows the fluorescence spectra of a 1 mg/L solution of 80/20 fluoranthene-pyrrole copolymer after adding various amounts of picric acid.

Two solutions of 80/20 fluoranthene-pyrrole copolymer were prepared: (i) 20 mg/L in NMP and (ii) 1 mg/L in NMP. Picric acid (2,4,6-trinitrophenol) was incrementally added to each solution while the amount of the copolymer remained constant (i.e., 1 mg/L or 20 mg/L of 80/20 fluoranthene-pyrrole copolymer in NMP). The fluorescence was measured using a 415 nm excitation wavelength. The results for the concentrated solution and dilute solution are shown in FIGS. 13 and 14, respectively.

This Example demonstrates that the copolymer's fluorescence is quenched by nitroaromatics and the quenching is proportional to the concentration of the nitroaromatic. Accordingly, fluoranthene-pyrrole copolymers can be used to detect nitroaromatics based on changes to the fluorescence spectra.

Example 10

Copolymer Films for Sensing Nitroaromatic Picric Acid

Figure 15:
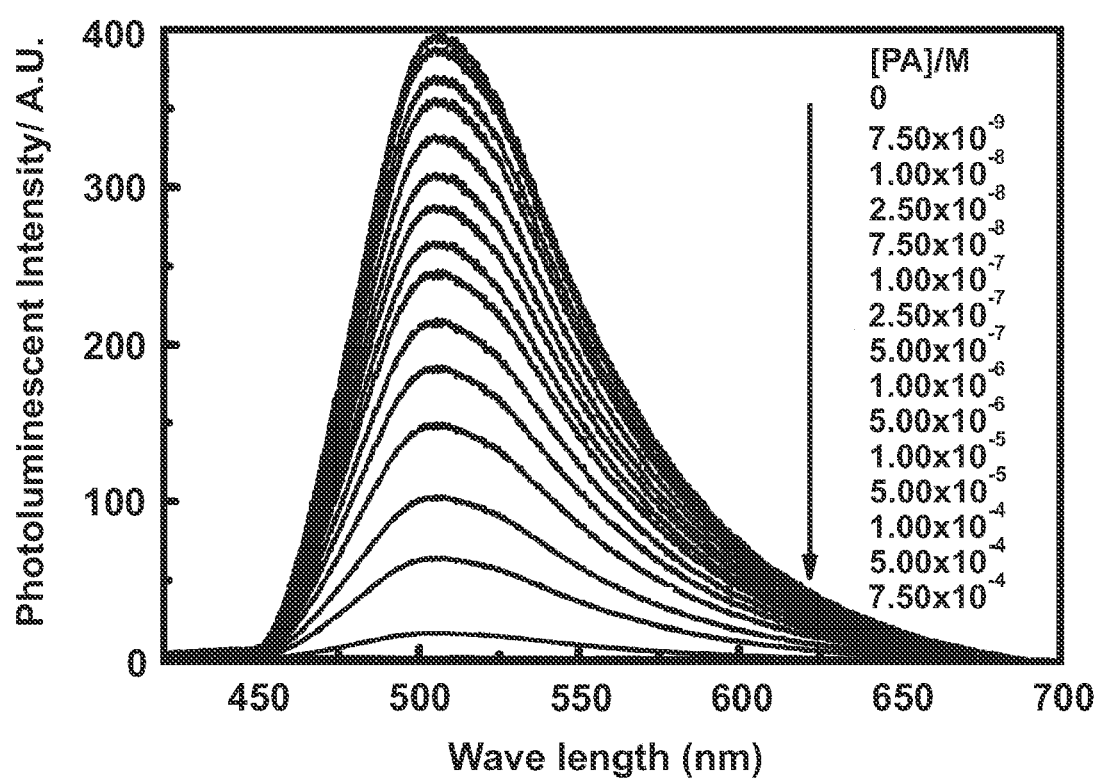
FIG. 15 shows the fluorescence spectra of a composite film that includes an 80/20 fluoranthene-pyrrole copolymer. The fluorescence spectra were measured after the film contacted an aqueous solution with various concentrations of picric acid.

A composite copolymer film prepared according to the general procedures in Example 7 was contacted with various aqueous solutions containing various concentrations of picric acid. The fluorescence of the copolymer film was measured after contacting each solution. The results are shown in FIG. 15. This result demonstrates that solid forms of the copolymer can also be used to detect nitroaromatics.

Figure 16:
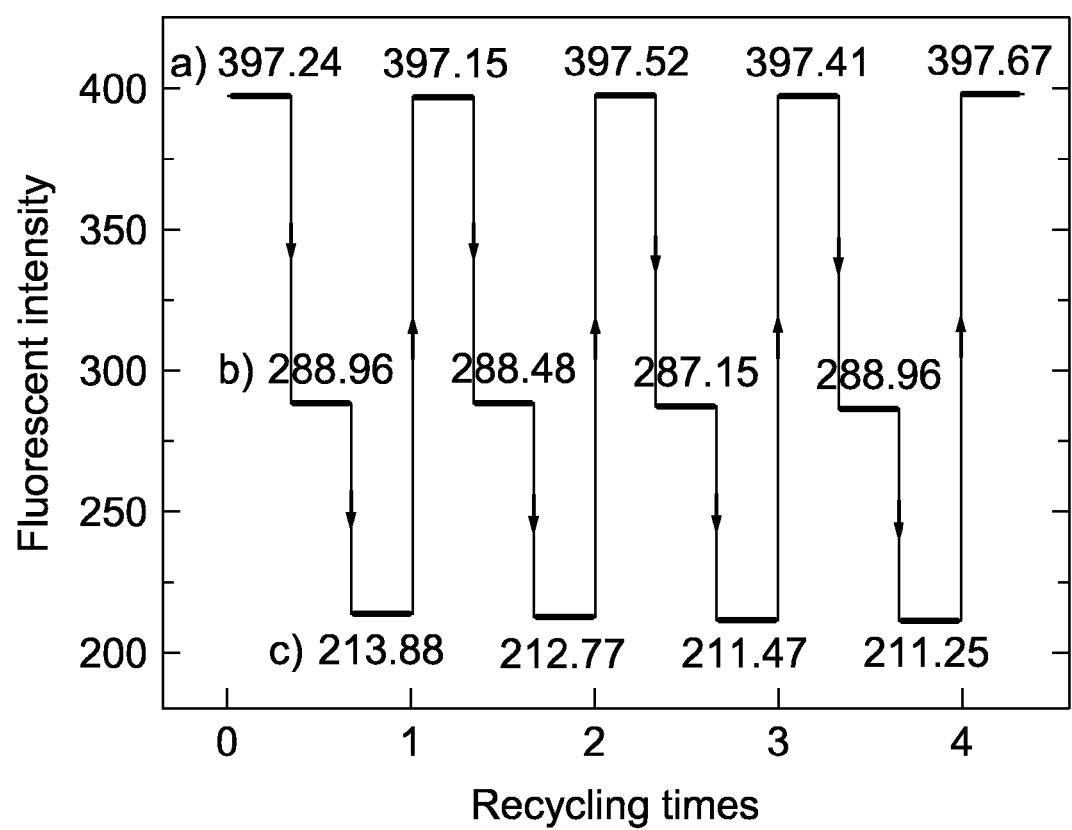
FIG. 16 show the recycling fluorescence response at 504 nm of the composite film containing 0.99 wt % FA/PY copolymer among three picric acid concentrations of: (i) 0 M picric acid, (ii) $2.5 \cdot 10^{-7}$ M picric acid, and (iii) $5.0 \cdot 10^{-6}$ M picric acid.

Considering the film sensors were capable of detecting nitroaromatics, the reversibility and selectivity of this detection was further investigated. Initially, the composite film containing 0.99 wt % the FA/PY copolymer was placed in the cuvette filled with blank solution (pure water). Upon being excited at 370 nm, the composite film emitted fluorescence at 504 nm and its intensity was recorded. Subsequently, the blank solution was replaced by $2.50 \times 10^{-7}$ M picric acid aqueous solution, and a reduced fluorescence intensity was recorded. After that the composite film was taken out of the solution and washed with water until the fluorescence intensity in the blank water remained almost was restored to near its original intensity. The cleaned composite film in the cuvette was refilled with $5.00 \times 10^{-6}$ M picric acid aqueous solution, and a further reduction in fluorescence intensity was recorded. These procedures were repeated four times. The results are shown in FIG. 16. The average fluorescence intensity values are 397.40 (RSD=0.0527%) for the blank solution (n=5), 287.86 (RSD=0.353%) for the $2.5 \times 10^{-7}$ M picric acid solution (n=4), and 212.34 (RSD=0.423%) for the $5.0 \times 10^{-6}$ M picric acid solution (n=4). This result indicates that the reversibility and reproducibility of the sensing film to nitroaromatics can be satisfactory. The recovery of the film was independent of the concentration switch from low to high or the reverse.

The selectivity of the composite copolymer film was also tested be exposing the film to possible interfering molecules at high concentrations. The fluorescence intensity when contacting $2.5 \cdot 10^{-7}$ M picric acid in aqueous solution ($F_1$) was compared with the fluorescence intensity when contacting $2.5 \cdot 10^{-7}$ M picric acid in aqueous solution with an additional molecule. The results are shown in Table 5. This result demonstrates the copolymer can be highly selective for detecting nitroaromatics because other molecules generally have a minimal effect on fluorescence.

TABLE 5

Effect of Possible Interfering Molecules on Fluorescence Intensity

| Interfering Molecule | Concentration (M) | Fluorescence Intensity ($F_2$) | Fluorescence Change $\Delta F = (F_1 - F_2)$ | $\Delta F/F_1$ (%) |
|---|---|---|---|---|
| Na$^+$ | $1.00 \times 10^{-2}$ | 394.6 | 2.6 | 0.65 |
| K$^+$ | $1.00 \times 10^{-2}$ | 396.6 | 0.6 | 0.15 |
| Ca$^{2+}$ | $1.00 \times 10^{-2}$ | 395.8 | 1.4 | 0.35 |

TABLE 5-continued

Effect of Possible Interfering Molecules on Fluorescence Intensity

| Interfering Molecule | Concentration (M) | Fluorescence Intensity ($F_2$) | Fluorescence Change $\Delta F = (F_1 - F_2)$ | $\Delta F/F_1$ (%) |
|---|---|---|---|---|
| Ni$^{2+}$ | $1.00 \times 10^{-3}$ | 393.4 | 3.8 | 0.96 |
| Cu$^{2+}$ | $1.00 \times 10^{-2}$ | 395.3 | 1.9 | 0.48 |
| Hg$^{2+}$ | $1.00 \times 10^{-3}$ | 394.7 | 2.5 | 0.63 |
| Pb$^{2+}$ | $1.00 \times 10^{-3}$ | 392.5 | 4.7 | 1.18 |
| Cl$^-$ | $1.00 \times 10^{-3}$ | 399.4 | −2.2 | −0.55 |
| NO$_3^-$ | $1.00 \times 10^{-4}$ | 393.1 | 4.1 | 1.03 |
| SCN$^-$ | $1.00 \times 10^{-3}$ | 391.7 | 5.5 | 1.38 |
| ClO$_4^-$ | $1.00 \times 10^{-4}$ | 394.6 | 2.6 | 0.65 |
| SO$_4^{2-}$ | $1.00 \times 10^{-3}$ | 393.8 | 3.4 | 0.86 |
| Nitric acid | $1.00 \times 10^{-4}$ | 393.1 | 4.1 | 1.03 |
| Hydrochloric acid | $1.00 \times 10^{-3}$ | 399.4 | −2.2 | −0.55 |
| Sulfuric acid | $1.00 \times 10^{-3}$ | 393.8 | 3.4 | 0.86 |
| Perchloric acid | $1.00 \times 10^{-4}$ | 394.6 | 2.6 | 0.65 |
| Aniline | $1.00 \times 10^{-3}$ | 402.3 | −5.1 | −1.28 |
| Phenol | $1.00 \times 10^{-3}$ | 395.4 | 1.8 | 0.45 |
| Acetone | $1.00 \times 10^{-3}$ | 396.1 | 1.1 | 0.28 |

What is claimed is:

1. A copolymer comprising at least one optionally substituted fluoranthene as a first monomer unit and at least one optionally substituted pyrrole as a second monomer unit.

2. The copolymer of claim 1, where the first monomer unit is represented by Formula I:

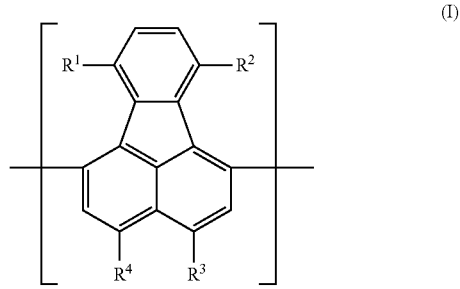

wherein $R^1$, $R^2$, $R^3$, and $R^4$ are each independently selected from the group consisting of hydrogen, $C_{1-6}$ alkyl, $C_{1-6}$ haloalkyl, $C_{1-6}$ alkoxy, $C_{1-6}$ hydroxyalkyl, ester, carboxy, and $C_{1-6}$ alkyl-N($R^5$)($R^6$), and wherein $R^5$ and $R^6$ are each independently selected from hydrogen and $C_{1-6}$ alkyl.

3. The copolymer of claim 2, wherein $R^1$, $R^2$, $R^3$, and $R^4$ are each independently selected from the group consisting of hydrogen and $C_{1-6}$ alkyl.

4. The copolymer of claim 2, wherein $R^1$, $R^2$, $R^3$, and $R^4$ are each hydrogen.

5. The copolymer of claim 2, wherein $R^1$ and $R^2$ are the same.

6. The copolymer of claim 2, wherein $R^3$ and $R^4$ are the same.

7. The copolymer of claims 1, wherein the second monomer unit is represented by Formula II:

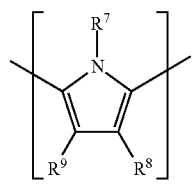

(II)

wherein $R^7$, $R^8$, and $R^9$ are each independently selected from the group consisting of hydrogen and $C_{1-6}$ alkyl.

8. The copolymer of claim 7, wherein $R^7$, $R^8$, and $R^9$ are each hydrogen.

9. The copolymer of claim 7, wherein $R^8$ and $R^9$ are the same.

10. The copolymer of claim 1, wherein the copolymer comprises at least about 30% of the first monomer unit by mole.

11. The copolymer of claim 1, wherein the copolymer comprises no more than about 99% of the first monomer unit by mole.

12. The copolymer of claim 1, wherein the copolymer comprises at least about 1% of the second monomer unit by mole.

13. The copolymer of claim 1, wherein the copolymer comprises no more than about 70% of the second monomer unit by mole.

14. The copolymer of claim 1, wherein the molar ratio of the first monomer unit to the second monomer unit is about 30:70 to about 99:1.

15. The copolymer of claim 1, wherein the copolymer exhibits an electrical conductivity of at least $10^{-6}$ S·cm$^{-1}$ when doped with an effective amount of a dopant.

16. The copolymer of claim 15, wherein the dopant is iodine.

17. The copolymer of claim 1, wherein the copolymer exhibits a green emission when exposed to ultraviolet or violet radiation.

18. The copolymer of claim 17, wherein the green emission has a wavelength of peak emission of about 490 nm to about 570 nm.

19. The copolymer of claim 17, wherein the ultraviolet or violet radiation has a peak wavelength of about 350 nm to about 450 nm.

20. The copolymer of claim 1, wherein the copolymer has a weight average molecular weight of at least about 1,000 Da.

21. A method of making a copolymer, the method comprising:
forming a composition comprising an oxidizing agent, at least one optionally substituted pyrrole monomer, and at least one optionally substituted fluoranthene monomer; and
maintaining the composition under conditions effective to polymerize the pyrrole monomer and fluoranthene monomer to form the copolymer.

22. The method of claim 21, wherein the molar ratio of the pyrrole monomer to the fluoranthene monomer is about 70:30 to about 1:99.

23. The method of claims 21, wherein the molar ratio of the oxidizing agent to a total amount of monomer components in the composition is no more than about 3:1.

24. The method of claim 21, wherein the composition is maintained at a temperature of about 30° C. to about 70° C.

25. The method of claim 21, wherein forming the composition comprises combining (a) a first solution comprising a first solvent and the oxidizing agent and (b) a second solution comprising a second solvent, the pyrrole monomer, and the fluoranthene monomer, wherein:
the first solvent is at least partially immiscible in the second solvent;
the oxidizing agent is soluble in the first solvent; and
both the pyrrole monomer and the fluoranthene monomer are soluble in both the first and second solvents.

26. An apparatus comprising:
a light source configured to emit an ultraviolet or violet radiation; and
a composition configured to receive at least a portion of the radiation emitted from the light source, wherein the composition comprises a copolymer comprising at least one optionally substituted fluoranthene as a first monomer unit and at least one optionally substituted pyrrole as a second monomer unit.

27. The apparatus of claim 26, further comprising a light detector configured to measure light emitted from the composition.

28. The apparatus of claim 27, further comprising a housing, wherein the housing contains the composition and is configured to receive a sample adjacent to the composition.

29. An organic light-emitting diode comprising:
a light-emitting active layer;
a conducting layer on one side of the light-emitting active layer;
a cathode; and
an anode, wherein the light-emitting active layer and conducting layer are disposed between the cathode and the anode, and the light-emitting active layer comprises a copolymer comprising at least one optionally substituted fluoranthene as a first monomer unit and at least one optionally substituted pyrrole as a second monomer unit.

30. A method of producing light comprising exposing a composition to a violet or ultraviolet radiation, wherein the composition comprises a copolymer comprising at least one optionally substituted fluoranthene as a first monomer unit and at least one optionally substituted pyrrole as a second monomer unit.

31. A method for detecting nitroaromatics within a sample, the method comprising:
providing a sample suspected of containing one or more nitroaromatics;
contacting a composition to the sample, wherein the composition comprises a copolymer comprising at least one optionally substituted fluoranthene as a first monomer unit and at least one optionally substituted pyrrole as a second monomer unit;
exposing the composition to a radiation effective to produce fluorescence from the copolymer; and
measuring the amount of fluorescence produced by the copolymer.

32. The method of claim 31, wherein the produced fluorescence is greater in the absence of nitroaromatics than in the presence of nitroaromatics.

* * * * *

UNITED STATES PATENT AND TRADEMARK OFFICE
CERTIFICATE OF CORRECTION

| | | |
|---|---|---|
| PATENT NO. | : 8,394,643 B2 | Page 1 of 2 |
| APPLICATION NO. | : 13/382888 | |
| DATED | : March 12, 2013 | |
| INVENTOR(S) | : Li et al. | |

It is certified that error appears in the above-identified patent and that said Letters Patent is hereby corrected as shown below:

Title Page 2, in Item (56), under "FOREIGN PATENT DOCUMENTS", in Column 1, Line 1, delete "CN 101328255 A 12/2008".

Title Page 2, in Item (56), under "OTHER PUBLICATIONS", in Column 1, Line 38, delete "Exposive" and insert -- Explosive --, therefor.

Title Page 2, in Item (56), under "OTHER PUBLICATIONS", in Column 2, Line 14, delete "N,N-dibenzy1-3," and insert -- N,N-dibenzyl-3, --, therefor.

Title Page 2, in Item (56), under "OTHER PUBLICATIONS", in Column 2, Line 51, delete "soluable" and insert -- soluble --, therefor.

In the Drawings

In Fig. 12, Sheet 7 of 10, delete "Poloymerization" and insert -- Polymerization --, therefor.

In the Specifications

In Column 4, Line 1, delete "is wide-angle" and insert -- is a wide-angle --, therefor.

In Column 4, Line 3, delete "is wide-angle" and insert -- is a wide-angle --, therefor.

In Column 4, Line 29, delete "show" and insert -- shows --, therefor.

In Column 5, Line 64, delete "1-ethyl-4-methyltluoranthene," and insert -- 1-ethyl-4-methylfluoranthene, --, therefor.

In Column 7, Line 4, delete "$R^7$. $R^8$" and insert -- $R^7$, $R^8$ --, therefor.

Signed and Sealed this
First Day of October, 2013

Teresa Stanek Rea
*Deputy Director of the United States Patent and Trademark Office*

CERTIFICATE OF CORRECTION (continued)
U.S. Pat. No. 8,394,643 B2

In the Specifications

In Column 8, Line 24, delete "n-methylpyrrolidone," and insert -- n-methyl pyrrolidone, --, therefor.

In Column 8, Line 50, delete "trifluoracetic" and insert -- trifluoroacetic --, therefor.

In Column 13, Line 60, delete "$CH_3NO$," and insert -- $CH_3NO_2$ --, therefor.

In Column 14, Line 36, delete "1," and insert -- $I_2$ --, therefor.

In Column 14, Line 38, delete "1," and insert -- $I_2$ --, therefor.

In Column 17, Line 32, delete "that" and insert -- that, --, therefor.

In the Claims

In Column 18, Line 66, in Claim 7, delete "claims" and insert -- claim --, therefor.